A. HEBBARD,

Assignor to S. S. NEWTON & Co.

STOPPER FOR VOLATILE SALTS BOTTLES.

No. 10,172. Reissued Aug. 1, 1882.

Attest:
J. C. Turner
J. S. Barker

Inventor
Alonzo Hebbard
by
Doubleday & Bliss
attys

N. PETERS, Photo-Lithographer, Washington, D. C.

UNITED STATES PATENT OFFICE.

ALONZO HEBBARD, OF NEW YORK, ASSIGNOR TO S. S. NEWTON & CO., OF BINGHAMTON, NEW YORK.

STOPPER FOR VOLATILE-SALTS BOTTLES.

SPECIFICATION forming part of Reissued Letters Patent No. 10,172, dated August 1, 1882.

Original No. 134,600, dated January 7, 1873. Application for reissue filed March 26, 1873.

*To all whom it may concern:*

Be it known that I, ALONZO HEBBARD, a citizen of the United States, residing at New York, in the county of New York and State of New York, have invented certain new and useful Improvements in Stoppers for Volatile-Salts Bottles and other Purposes; and I do hereby declare the following to be a full description of the same.

The first part of my invention relates to the combination, with a bottle having an externally-screw-threaded neck, of an internally-screw-threaded cap provided with an apertured diaphragm, and a packing-block mounted in the diaphragm and adapted to close an opening through the neck of the bottle, and thus prevent the escape of its contents.

The second part of my invention relates to the combination, in a bottle-stopper, of an externally-screw-threaded discharge-tube provided at its upper end with a valve-seat, and an internally-screw-threaded cap provided with a stopper adapted to fit the valve-seat and having ports eccentric to the valve-seat for the discharge of the contents of the bottle, and having also a chamber above the eccentric ports adapted to collect material discharged through such ports and deliver it through a central orifice or port.

To describe my invention more particularly, I will refer to the accompanying drawings, forming part of this specification, the same letters of reference, wherever they occur, referring to like parts.

Figure 1:
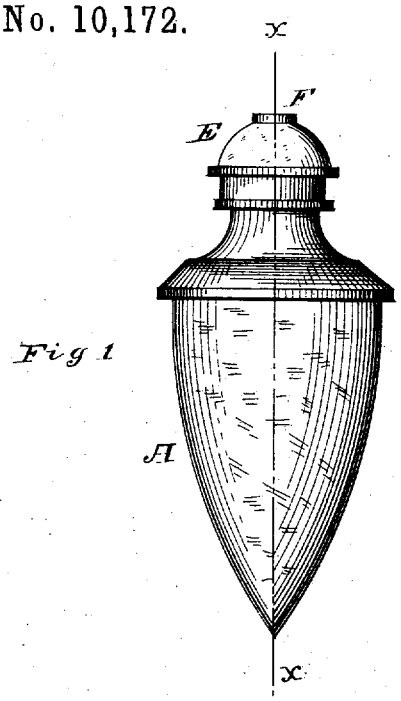
Figure 2:
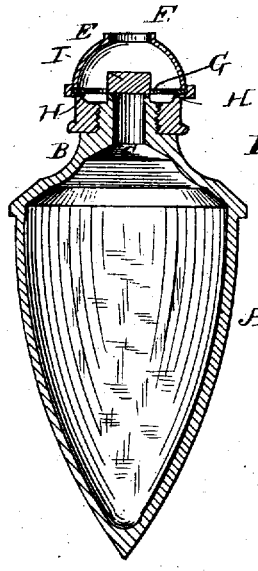
Figure 3:
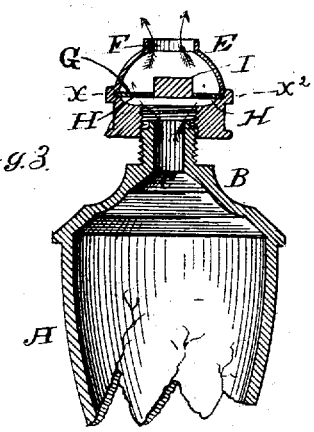
Figure 4:
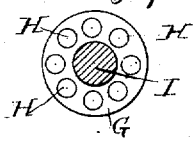

Figure 1 is a side view of the bottle with stopper attached thereto. Fig. 2 is a cut-sectional view of the same through the line $x\,x$, Fig. 1, showing the mouth of the bottle closed by the stopper. Fig. 3 is the same cut-sectional view, showing the mouth of the bottle open. Fig. 4 is a plan view of the diaphragm and plug of rubber therein on the line $x^2\,x^2$, Fig. 3.

Letter A represents the bottle, which may be made of metal, glass, or other suitable material, having screw-threads B cut on the neck thereof, and its central opening C slightly projecting above the line of the screw-threads. The object of making the edges of the central opening C more prominent than the screw part of the neck of the bottle is to obtain a better surface to stop the opening than if made with a broader surface; and, second, to make the opening small enough to admit of the escape of the vaporized salts around the stopper without making the screw-cap E disproportionately large to the size of the bottle. This screw-cap is made of metal of a dome or any other suitable shape, with a central opening, F, at the apex of it. Across its internal diameter, about on a line with the spring of the arch of the dome, is firmly secured a diaphragm, G, having a number of perforations, H, through it, and surrounding a central cavity, in which is inserted a plug of india-rubber or leather, I, or other suitable material. The object of this plug is to act as a stopper to the opening in the neck of the bottle when the cap is screwed down, as shown in Fig. 2, and the perforations H are for the purpose of allowing the volatilized salts to escape from the bottle past the stopper, as shown by the arrows in Fig. 3, without the necessity of detaching the cap entirely from the neck of the bottle. Thus the edges of the central opening C form a valve-seat adapted to receive the stopper, whereby the passage of the contents of the bottle is prevented when the parts are in the position shown in Fig. 2. By this means it will be obvious that there can be but little risk of loss of the cap, and at the same time it affords a most perfect means for stopping the mouth of the bottle.

I am aware that a somewhat similar construction is shown in English patent A. D. 1856, No. 2,410; but in said patent the valve or stopper, having eccentric ports around it, is carried by a discharge tip or nozzle which screws into that part of the stopper which corresponds to my externally-screw-threaded bottle-neck B, thus contracting materially the space through which material can be discharged from the bottle, and necessitating the employment of very small eccentric discharge-ports, and thereby interfering with the use of the bottle for any material except such as will readily pass through these very small ports, whereas by my construction I am enabled to make my ports of such size as may be sufficient to effect a free discharge of the contents of the bottle.

Having now described my invention, I will proceed to set forth what I claim and desire to secure by Letters Patent of the United States—

1. The combination of the bottle A, the screw-cap E, having an apertured diaphragm, G, therein, and the packing-block I, made as described, and all arranged to operate as set forth.

2. In a bottle-stopper, the combination of the discharge-tube, screw-threaded externally, and having a valve-seat at its upper end, and a cap screw-threaded internally to engage with the screw-thread of the discharge-tube, and provided with a stopper adapted to fit the valve-seat and having eccentric discharge port or ports and a chamber above said ports adapted to collect material discharged by said ports and deliver the same through a central orifice, substantially as set forth.

ALONZO HEBBARD.

Witnesses:
H. B. DOMINICK,
CHARLES L. BARRETT.